: 3,006,845
WATER-IN-OIL EMULSION WELL FLUID AND
MATERIALS FOR PREPARING SAME
Orien W. Van Dyke and William A. Reddie, Houston,
Tex., assignors to Magnet Cove Barium Corporation,
Houston, Tex., a corporation of Arkansas
No Drawing. Filed Apr. 2, 1956, Ser. No. 575,326
8 Claims. (Cl. 252—8.5)

This invention relates to improvements in water-in-oil (invert) type emulsion fluids which are especially suitable for use in the drilling, completing or working over of wells. In one of its aspects, the invention relates to an improved dry, free-flowing concentrate and a method of using the same, for the preparation of such water-in-oil emulsion well fluids. In another of its aspects, the invention relates to a water-in-oil emulsion well fluid of improved stability, particularly at elevated temperatures, and improved capacity for suspending weight materials.

In co-pending application Serial Number 456,629, series of 1948, now U.S. Patent No. 2,885,358, there is disclosed a water-in-oil emulsion well fluid, and a concentrate for making the same, in which trivalent or higher valence metal salts are employed to stabilize the emulsion in conjunction with surface-active agents. The preferred formula for the dry concentrate disclosed in such application included adsorptive clay, sodium chloride, alum, barium chloride, Sterox CD, commercial lecithin and a preservative for the latter. While such a concentrate and the emulsion fluids formed therefrom have been satisfactorily used in wells and have exhibited the advantages claimed for them, it has now been found possible to improve upon both the concentrate and the emulsion fluids, and it is a general object of this invention to provide both an improved concentrate and emulsion fluid of the general nature disclosed in the co-pending patent application.

The water-in-oil emulsion fluid disclosed in the co-pending application exhibited a marked resistivity to inversion when contaminated with solids and could therefore be weighted to a certain extent with weighting material such as barite. It is an object of this invention to further improve upon the weight-suspending abilities of such type emulsion fluid and to provide an emulsion fluid which can be weighted to relatively high weight without inverting to an oil-in-water emulsion.

Another object is to provide an improved invert emulsion fluid in which expanded perlite is employed not only to improve the weight-suspending ability of the emulsion fluid and its ease of mixing but also to act as a carrier for one or more of the liquid ingredients of a dry concentrate from which the emulsion fluid is formed.

Another object is to provide an invert emulsion fluid which has its weight-suspending ability and the ease with which it is formulated improved by the addition of a petroleum sulfonate.

Another object is to provide an invert emulsion fluid having a vegetable pitch incorporated therein to improve its resistance to heat.

Another object is to provide dry concentrates from which invert emulsion fluids mentioned in the foregoing objects can be prepared.

Another object is to provide methods for using the concentrates and invert emulsion fluids of the foregoing objects in the drilling, completion or work-over of wells in an improved and more facile manner.

Other objects, advantages and features of this invention will be apparent to one skilled in the art upon consideration of the written specification and the appended claims.

Generally, one aspect of the concept of this invention involves the use of expanded perlite, preferably in combination with selected ones of adsorptive clays or minerals, as a carrier or adsorber for normally liquid or tacky low melting point ingredients, particularly vegetable pitch, so as to provide a dry, free-flowing mixture or concentrate. When vegetable pitch is employed as a part of the concentrate, it has been found that it can be adsorbed on the perlite and yet the pitch is given up or extracted by the oil phase of the invert emulsion much more readily than when it is adsorbed on clay. Further, the perlite acts in the emulsion fluid to increase the latter's weight-suspending ability without inverting or "flipping" to an oil-in-water type emulsion.

In connection with the formulation of the dry concentrate, it has been found that magnesium oxide greatly improves the dry and free-flowing characteristics of the concentrate. This oxide, as well as lime and sodium carbonate, greatly improves the stability of emulsions of this invention but it is the magnesium oxide which improves the dry, free-flowing characteristics of the concentrate, whereas lime actually is deleterious thereto. It has been found that when the concentrate is formulated, the order of mixing of the ingredients is important. Thus, by premixing the vegetable pitch, perlite, and salts together prior to adding the magnesium oxide, clay, and other liquid ingredients, the resulting emulsions exhibit a much higher stability than when the magnesium oxide is pre-mixed along with the salts.

As another aspect of this invention, it has been found that vegetable pitch greatly improves the heat stability of the emulsion well fluid. Other pitches and bottoms products can also be employed, as will be discussed hereinafter. In any event, the use of the pitch and bottoms products permit the resulting emulsion fluids to be used in wells having relatively high bottom-hole temperatures without the emulsion becoming unstable, as evidenced by increase in fluid loss or even "flipping" of the emulsion to the oil-in-water type.

As still another aspect of this invention, it has been found that petroleum sulfonates will increase the weight-suspending ability of a water-in-oil emulsion well fluid so that weighting materials, such as barite, can be employed to make the emulsion fluid more comparable in its weighting characteristics to ordinary water-base muds. In this connection, it will be noted that both the petroleum sulfonates and perlite contribute to the weight-suspending ability of the emulsion fluid.

Insofar as the dry, free-flowing concentrate of this invention is concerned, there has been devised a preferred formula, as follows:

| Ingredient: | Parts by weight |
|---|---|
| Adsorptive clay (Xact 811) | 16 |
| Perlite | 6 |
| Sodium chloride | 7 |
| Alum (aluminum sulfate) | 7.8 |
| Barium chloride | 9.6 |
| Sterox CD | .75 |
| Commercial lecithin | 5.0 |
| Vegetable pitch 250 | 2 |
| Petronate L | 1.5 |
| Magnesium oxide | 1.5 |
| Bisphenol A (P,P′, Isopropylidene-diphenol) | 0.5 |
| Total | 57.65 |

The ingredients in the above formula are on an anhydrous basis, except that the alum has been weighed as $Al_2(SO_4)_3 \cdot 14H_2O$ and the barium chloride as $BaCl_2 \cdot 2H_2O$, which are chemically equivalent to 3.5 parts of $AlCl_3$, assuming complete reaction between the alum and barium chloride. Also, the figures in the right-hand column can be considered as pounds of the respective ingredients per barrel (42 gallons) of combined volume of the oil and water when a predetermined amount of the formula equal to the sum of the ingredients (57.65) is added to each such barrel of combined water and oil. Since it is more convenient and meaningful to speak in terms of pounds per barrel, such practice will be adhered to in this specification and claims except as otherwise noted.

While the ingredients of the above formula can be combined in a number of different manners, it is preferred that the vegetable pitch be mixed with the perlite before the adsorptive clay is added. This gives the perlite an opportunity to absorb the pitch before the latter can be adsorbed by the clay. Thus, the vegetable pitch can be heated to a temperature sufficiently high (e.g. 350° F.) to render it fluid and then added to a portion of the perlite specified in the preferred formula. After mixing, the balance of the perlite can be added, followed by the salts and other dry ingredients. Thereupon, a liquid mix containing the Sterox CD, lecithin, Petronate L and Bisphenol A can be heated (e.g. to 140° F.) to assure sufficient fluidity and added to the dry mixture. As will be pointed out in more detail hereafter, the order of mixing the formula has an effect on the properties of emulsions formed therefrom.

In preparing the water-in-oil emulsion fluid at the drilling site, it is preferred to add the formula to the oil and then emulsify the resulting mixture with the water. This always results in a desired water-in-oil type emulsion. As pointed out in the co-pending application, mixture of the formula with the water first and then bringing in the oil may result in oil-in-water type emulsion. This is not true for all types of systems and where it is desired for some reason to add the formula to the water first, a mere routine test will indicate whether such is feasible.

Although specific materials and concentrations are named in the above formula, it has been found that some latitude is possible with respect thereto. Further, while it is greatly preferred to combine the ingredients of the formula as a dry, free-flowing concentrate, they can be added separately to the oil and water phases to produce a water-in-oil emulsion having desired properties.

CLAY AND PERLITE INGREDIENTS

The role of these ingredients is to act as a carrier for the liquid components of the formula, whereby there is formed a dry, free-flowing concentrate. In a preferred formula, the perlite is employed predominantly to carry the vegetable pitch which it has been found facilitates rapid dissolution of the pitch in the oil. While it is possible to form dry concentrates using either the clay or the perlite alone, it is preferred to employ a proportion of each. When clay alone is used as the carrier, it has been found not only difficult to satisfactorily disperse the vegetable pitch therein, but even more difficult to cause the vegetable pitch to be dissolved in the oil phase. Apparently, the adsorptive power of the clay is too great, so that it tends to hold the pitch thereon and prevent its dissolution in the oil. On the other hand, when all perlite is employed, it is necessary to use rather large concentrations thereof in order to obtain a dry mixture. At such concentrations, the resulting concentrate has an excessively low density, thereby making it costly to ship and store. Thus, it is preferred that at least sufficient perlite be used to adequately disperse the vegetable pitch thereon and the balance of the carrier be the clay. Preferably, a concentration of perlite within the range of 3 to 15 pounds per barrel and a perlite-to-clay weight ratio within the range of 5:1 to 1:3 will be employed. Such an amount of perlite also results in the emulsion having increased weight suspending ability and the perlite can be increased to emphasize this.

The perlite employed is a standard article of commerce sometimes known as "expanded" perlite. It is manufactured by heat-treating the volcanic glass known as perlite mineral to cause expansion of the same. Preferably, the perlite used in this invention is the fines recovered from the heat-popping process.

As to the type of clay selected, it should have sufficient adsorptive power to permit, with reasonable minimum concentrations of clay, adsorption on the clay of the liquid ingredients of the formula (aside from the vegetable pitch) as well as moisture collecting in the concentrate from the atmosphere. As discussed in the above copending application, certain clays (e.g. attapulgite) will form a satisfactory concentrate insofar as its dry, free-flowing qualities are concerned, and yet the concentrate is not satisfactory to form an emulsion mud since it forms an oil-in-water type of emulsion. On the other hand, Attasorb (a heat-treated attapulgite) is satisfactory to form a dry, free-flowing mix and an emulsion. Other solids such as ground limestone or oyster shell do not form a dry, free-flowing concentrate but one which is sticky or lumpy and yet the concentrate, though sticky or lumpy, forms a satisfactory emulsion mud. Some clays, such as bentonite, may be satisfactory in forming both the concentrate and the emulsion mud but have a greater tendency than other clays, such as filter clay, to cause the emulsion to invert from a water-in-oil to an oil-in-water emulsion. Hence they are less preferred. Still further, some clays have greater adsorptive powers than others and hence need be present in lesser concentrations to afford a dry, free-flowing concentrate. Generally, the operable clays or minerals are those which have sufficient adsorptive powers to yield a dry, free-flowing concentrate when a reasonable amount of the clay or mineral is employed (at least 10 pounds per barrel and preferably 10 to 25 pounds per barrel of emulsion when a predetermined weight of concentrate containing at least 10 pounds of clay is added to the emulsion) and which clay or mineral results in a concentrate capable of imparting satisfactory mud properties to the water-in-oil emulsion mud. In any event, the evaluation of each individual clay with any given group of ingredients is a matter of mere routine test to one skilled in the art once the concept of this invention is known.

One clay which has been found to be particularly suitable presently bears the trade-mark Xact 811 and is Angelina County filter clay. It is found in pits in Angelina County, Texas, such as those approximately 8 miles south of Zavalla, Texas, and then one and one-half miles west of U.S. Highway 69. Such pits are on the G. W. Norton estate and the J. C. Everet survey, and they are so identified on the official survey plats. This clay is characterized by a very low yield (substantially nonhydratable) and has considerable adsorptive power. It has been found to result in a dry, free-flowing concentrate with a minimum amount of clay present (at least 2.5 parts by weight of clay per part by weight of the total of the liquid emulsifiers and any other liquids).

Another clay which has been found to be satisfactory, though to a lesser extent than Angelina County filter clay, is an adsorptive clay comprising predominantly calcium montmorillonite (sold under the trademark Xact) and found, for example, in Angelina County, Texas, on the W. C. Stanley survey, approximately 7 miles due south of Zavalla, Texas. It is classed as a drilling fluid clay and one having a higher yield and lower adsorptive power than Angelina County filter clay. Bentonite is also operable to produce a dry, free-flowing concentrate but, being highly hydratable, is not as preferred because it tends to lessen the stability of the emulsion. Other clays which have been found to be satisfactory in many instances are those sold under the name Baroco and under the trademark High Yield. Each of these clays is a relatively lowyield clay, such as calcium montmorillonite, which by suitable treatment has been upgraded to increase its yield.

Also found to be quite satisfactory is a clay sold under the name "Attasorb." This clay is an ultrafine (90–95% by weight finer than 10 microns), sorptive, calcined attapulgite (a fuller's earth), described chemically as a complex hydrated magnesium aluminum silicate having an approximate chemical analysis (volatile free basis) as follows:

| | Percent |
|---|---|
| $SiO_2$ | 67.0 |
| $Al_2O_3$ | 12.5 |
| $MgO$ | 11.0 |
| $Fe_2O_3$ | 4.0 |
| $CaO$ | 2.5 |
| Other | 3.0 |

It has a pH within the range of 7.5–8.5 and an oil adsorption index of 125–130 by the ASTM rub-out method.

STEROX CD AND LECITHIN SURFACE-ACTIVE AGENTS

While these two agents have been referred to above, it will be realized that others can be employed in their stead. In general, the surface-active agents disclosed in the Lummus Patent 2,661,334 are operable. The quantity of each of these surface-active agents can also be within the ranges set forth in such patent and hence, the disclosure of said patent with respect to these two ingredients is incorporated herein by reference. However, it should be pointed out that in some instances satisfactory emulsions can be made even when the water-soluble non-ionic surface-active agent (Sterox CD) is omitted. In such instances, the oil-soluble non-ionic surface-active agent is still employed. Lecithin is the preferred example of the oil-soluble emulsifier and at least 2.5 pounds of the oil-soluble surface-active agent should be employed per barrel of water-in-oil emulsion. It will be understood that where the term "lecithin" is employed, it refers usually to commercial lecithin. Commercial lecithin actually contains approximately equal portions of lecithin and cephalin and soybean oil, the latter serving as a solvent for the lecithin and cephalin. It will be appreciated that the pure compound as well as the commercial grades thereof can be employed in carrying out this invention.

The water-soluble emulsifier can be any nonionic water-soluble surface-active agent. At least 0.1 pound of agent should be employed per barrel of water-in-oil emulsion.

SALTS

Salts are preferably employed in the concentrate and emulsion of this invention to stabilize the emulsion. In the preferred formula, there is employed one or more salts, such as the chlorides, bromides, fluorides, sulfates, nitrates, etc., of heavy metals in which the metals exhibit a valency of 3 or higher (herein generally designated as "heavy metal salts" to distinguish from any sodium chloride, calcium chloride or the like which may also be present), and particularly where such metals have amphoteric properties. Preferred salts of this group comprise the water-soluble inorganic salts of metals selected from the group consisting of zirconium, tin, titanium, molybdenum, iron, vanadium and cobalt and the salts of aluminum which can be formed in situ, and most preferably from the group consisting of zirconium, tin, and the water-soluble inorganic salts of aluminum which can be formed in situ. Thus, in the above formula, aluminum sulfate and barium chloride are employed as the ingredients of the concentrate so that they will react in situ when the concentrate is made up with the oil and water, to form aluminum chloride, the resulting barium sulfate being substantially insoluble and appearing as a precipitate. Such a formation of aluminum chloride in situ has resulted in emulsions having superior properties when compared to those formed with either aluminum chloride added as such or with barium chloride alone or aluminum sulfate alone. Further, it will be appreciated that other reactants which are capable of forming a water-soluble aluminum salt in situ can be employed and that selection of other reactants can be accomplished by an exercise of the skill of the art once this disclosure is read and understood. Further, the other salts, such as those of iron, zirconium and tin, can be prepared in situ in the same manner as the aluminum salt to achieve superior results.

Before proceeding further, it might best be explained that the 7 pounds per barrel of sodium chloride set forth in the formula is approximately the amount required to yield 30,000 parts per million of this salt in the aqueous phase of an emulsion containing 60 volume percent of water. At such concentration of sodium chloride, the hydration of clays encountering the water phase is reduced to a minimum and it is preferred that sufficient sodium chloride be employed to yield such a concentration in the aqueous phase irrespective of the volume percent of the aqueous phase employed. Of course, the sodium chloride can be omitted entirely from the emulsion if desired but generally such omission will result in an emulsion mud of lesser stability. This will be less true when saturated salt water is employed as the aqueous phase.

The amount of the heavy metal salt employed should be sufficient to impart increased stability to the emulsion mud. Thus, at least one and preferably at least three pounds of the heavy metal salt per barrel of emulsion is employed. Generally, increasing the amount of the selected heavy metal salt employed will increase the stability of the mud and usually the upper limit of heavy metal salt concentration will be dictated by economics. It has been found that a heavy metal salt concentration within the range of 1 to 15, preferably 3 to 10, pounds per barrel of emulsion will be satisfactory. In the case of the reactive ingredients, such as aluminum sulfate and barium chloride, added to form the desired heavy metal salt in situ, stoichiometric equivalents to yield the final concentration of desired heavy metal salt are employed.

HEAVY OIL OR FAT FRACTION

The principal role of this ingredient in the emulsion is to increase the ability of the emulsion to suspend weight material therein and to increase the stability of the emulsion against inversion when exposed to high temperatures or pressures. Further, this ingredient improves the ability of the emulsion to resist the detrimental effects of normal contaminants such as cement, lime, caustic, etc. Also, this ingredient has been found useful as a treating agent in the emulsions of this invention in that it can be used to increase the viscosity of the mud where necessary. This is particularly true where the mud has been contaminated with certain synthetic cements, such as those containing phosphoric acid, phosphates, kaolin clay, bauxite, fluospar, coal and potassium sulfate. This ingredient also has been found useful to treat a weighted mud from which weighting material settles out. Thus, addition of the ingredient to such a mud causes the weighting material to be re-suspended in the mud. The ingredient can be so used in the form of a solution thereof in oil.

In general, the higher molecular weight fractions of animal fats, vegetable oils and tall oils, and derivatives thereof, can be employed in accordance with this invention, with vegetable pitch being preferred. The higher molecular weight fraction is derived from crude animal fats, vegetable oils or tall oils by fractional distillation or solvent extraction to remove the lower molecular weight substances, such as the ordinary fatty acids, and thereby yield a bottoms product (termed "pitch" in the specification and claims) of relatively higher average molecular weight than that of the original crude oil or fat. Among the "pitches," vegetable pitch, tall oil pitch, ebony fat and derivatives (e.g. amine or nitrile) thereof are especially desirable.

The vegetable pitches employed in accordance with this invention are commercially available from various sources and are identified in the trade by the term "vegetable pitch." They are tacky, viscous, dark brown materials commercially produced from cotton seed, corn, and soybean oils. They may also contain minor amounts of constituents from coconut and peanut oils, and from animal fats and oils, such as tallows and greases. The crude vegetable oil starting material consists mainly of fatty acid triglycerides, with minor amounts of sterols, vitamins, antioxidants, pigments, hydrocarbons, alcohols, and ketones. The crude oils also contain varying amounts of free fatty acids.

In accordance with one process for producing commercial vegetable pitches, the crude vegetable oil starting material is treated with aqueous caustic to remove the free fatty acids and other non-glyceride material. The thus removed reaction product, called raw soapstock, consists of soap, oil and non-glyceride material. The raw soapstock is treated with sulphuric acid or the like and the soaps are converted to free fatty acids and the product, called acid soapstock, consists of fatty acids, oil, and non-glyceride material. The term "oil" is, of course, used to designate the fatty acid triglyceride. In general, the composition of vegetable oils and acid soapstock is as follows:

| Material | Percent fatty acids | Percent glycerine (as glycerides) | Percent unsaponifiables |
|---|---|---|---|
| Vegetable oils | 88–90 | 9–10 | 1–2 |
| Acid soapstocks | 85–95 | 0.5–2 | 1–3 |

The vegetable oils, or the acid soapstocks, or both, are passed through a high-pressure continuous splitter. In the splitter, these materials are intimately mixed with water and steam at about 500° F. at 760 p.s.i. The water reacts with the glycerides to form free fatty acids and glycerine, which are separated. The resulting crude fatty acid fraction contains approximately 2% unsaponifiables, 4% glycerides and 94% free fatty acids. This fraction is then fed to a continuous fractionating still, where approximately 80% of the fraction is distilled overhead as fatty acids while the remainder is continuously removed from the bottom of the still as "still vegetable residue." The distillation is conducted at 2–5 mm. pressure and at a temperature of about 510° F., with a very small percentage of steam being injected into the base of the column. The average time during which the residue is subjected to these conditions is about four hours.

As mentioned above, vegetable pitch can be derived from cotton seed, corn and soybean oils. Each of these oils can be separately refined as above described to provide individual "still vegetable residues" or they can be premixed to form a composite feed resulting in a composite residue. In any event, it is the usual practice to use a mixture of the residues from these three oils as a feed for the pitch producing process.

Various vegetable pitches are produced by further stripping the mixed still residues in a batch still at 2–5 mm. pressure and at 480° F. for about eight hours. The stripping is continued, with removal of lighter overhead products, until the pitch or bottoms has the desired specifications. In one instance, Vegetable Pitch 250 is provided by continuing the distillation until the bottoms has a viscosity of 9–19 seconds at 165° C. in a Zahn G–5 cup. A lighter pitch can be obtained by stopping the stripping while the bottoms has a viscosity 8.5–10 seconds at 125° C. in a Zahn G–5 cup.

In the usual case, between 20% and 25% of the original still residue is removed as an overhead product of the batch distillation to produce the vegetable pitch. The sterols, hydrocarbons, alcohols, antioxidants, pigments, aldehydes, ketones, etc., which are originally present in the still residue are carried over to a certain extent to appear as a part of the pitch or bottoms product of the batch distillation. A goodly proportion of the original percentage of these materials will be degraded or converted to other forms in the various processing steps. Under the conditions of distillation, particularly of the batch distillation, the unsaturated fatty acids will polymerize and some fatty acids will be decarboxylated. Some fatty acid anhydrides and lactones will also be formed.

Thus, corn, cottonseed and soy oils contain relatively large proportion of unsaturated fatty acids. When treated by the above process, these acids polymerize, especially during the high-temperature distillation and stripping steps. This polymerization seems to be of importance in giving these products the qualities desired here, since it results in increasing the quantity of higher molecular weight (polymeric) materials present.

The higher molecular weight fraction can also be derived from the crude oils or fats by a solvent extraction which separates the crude oils or fats into fractions of relatively high and low molecular weight.

A typical pitch which has been found to be excellent has the following typical composition:

VEGETABLE PITCH 250

| | |
|---|---|
| Unsaponifiable matter | 15%. |
| Softening point, ball and ring | 35° C. |
| Acid value | 55 (45–65). |
| Saponification value | 130 (120–135). |
| Iodine value | 80 (70–90). |
| Color (Barrett) | 18. |
| Free fatty acids | 27% minimum. |
| Triglycerides, anhydrides and lactones | 40% minimum. |

This particular pitch has a viscosity (Zahn G–5 orifice) within the range of 9–19 seconds at 165° C. It contains about 0.5% of moisture and volatile matter.

Another vegetable pitch, which is obtained in the same general manner as vegetable pitch 250 but which is less preferable and contains less polymerized acids and more unsaponifiable material, has a typical composition as follows:

VEGETABLE PITCH 150

| | |
|---|---|
| Unsaponifiable matter | 23%. |
| Softening point, ball and ring | 32° C. |
| Acid value | 45. |
| Saponification value | 125. |
| Iodine value | 95. |
| Color (Barrett) | 16. |
| Free fatty acids | 22% minimum. |
| Triglycerides, anhydrides and lactones | 40% minimum. |

It has a viscosity (Zahn G–5 orifice) between 8.5 and 10.0 seconds at 125° C. Its moisture and volatile components amount to about 0.5%.

Other pitches useful in accordance with this invention are the tall oil pitches. They are tacky, viscous, dark brown liquids produced from crude tall oil by vacuum distillation at elevated temperatures (e.g. 5–15 mm. pressure and 400° to 600° F.). Steam can also be used to help strip out the lighter components. In any event, a major proportion of the fatty acids and a somewhat lesser proportion of the rosin acids are removed as an overhead product leaving a bottoms product or pitch richer in higher molecular weight products, particularly in rosin and fatty acids which have been polymerized in the process, than was the original tall oil. Thus this pitch comprises a mixture of polymerized and monomeric rosin and fatty acids, rosin anhydrides, esteolides, esters, hydrocarbons, aldehydes, ketones, sterols and sulfur lignin. One useful tall oil pitch has the following specifications:

| | |
|---|---|
| Viscosity (Zahn G–3 orifice at 125° C.) | 13–19 seconds. |
| Acid value | 60–80. |
| Color (Barrett) | 15. |
| Moisture and volatile | 0.5%. |
| Rosin acids | 22%. |
| Unsaponifiable matter | 22%. |
| Softening point, ball and ring | 32° C. |
| Saponification value | 115. |
| Iodine value | 100. |
| Viscosity, poises at 135° C | 1.5 |

Another tall oil pitch, of slightly less desirable character, has the following specifications:

| | |
|---|---|
| Viscosity (Zahn G–3 orifice at 125° C.) | 9–15 seconds. |
| Acid value | 80–100. |
| Color (Barrett) | 14. |
| Moisture and volatile | 0.5%. |
| Rosin acids | 30%. |
| Unsaponifiable matter | 19%. |
| Softening point, ball and ring | 32° C. |
| Saponification value | 130. |
| Iodine value | 90. |
| Viscosity, poises at 125° C | 1.0. |

The above tall oil specifications are typical and for those values not listed as a range, it will be understood that they can deviate somewhat without the pitch losing all of its usefulness in this invention.

In some instances, the vegetable oils or the tall oils above mentioned are reacted to add one or more amine or nitrile groups to a molecule of fatty or rosin acid as the case may be. These reacted materials are then subjected to fractionation to form pitches as above described with respect to the unreacted vegetable or tall oils. Thus, for example, the vegetable oil can be so reacted prior to the distillation step from which the "still residue" is evolved as a bottoms product. In the case of the reacted vegetable oil, this residue will be similar to the residue from the unreacted vegetable oil except that amine or nitrile groups will be present as part of the acid molecules. The residue can then be stripped as above described to yield an "amine pitch" or a "nitrile pitch" as the case may be. Where tall oil is reacted to form an amine or nitrile derivative thereof, such reaction takes place prior to the vacuum distillation resulting in the pitch but otherwise, the pitch-producing process is as above described.

A solvent extraction product found to be useful is one prepared by solvent extracting cottonseed oil with propane or other light hydrocarbon solvent. There results a high molecular weight fraction comprising not more than 5% by volume of the original cottonseed oil starting material and consisting principally of color bodies, gums and resins. Such product is identified herein as "ebony fat" and may be prepared in the manner taught in U.S. Patent 2,521,234 to W. M. Leaders. One product which is commercially available and which is useful in this invention has the following specifications.

| | |
|---|---|
| Moisture | 5%. |
| Iodine value | 50–60. |
| Saponification value | 180–200. |
| Unsaponifiables | 1–3%. |
| Oxidized fat | 15% approx. |
| Total fatty acids | 70% approx. |
| Free Fatty acids as oleic | 20% approx. |

It is a liquid at room temperature.

The heavy fat or oil fraction can be used in an amount sufficient to increase the weight suspending ability of the mud and, where desired, to increase the viscosity of the mud. At least 0.5 and preferably at least 1 pound per barrel of emulsion should be used. Stated in terms of ranges, an amount within the range of 0.5 to 15, preferably 1 to 5, pounds per barrel of emulsion is usable; although it will be understood that the upper limit is dictated primarily by economics since additional amounts give progressively smaller improvements.

PETROLEUM SULFONATE

The function of this material in the invert emulsion is to increase the capacity of the emulsion for supporting weighting materials such as barite. It also has the ancillary function of increasing the ease with which stable emulsions are formed, i.e., decreasing the mixing required. While it is possible to form satisfactory emulsions without this ingredient, it is greatly preferred to use the same when the emulsion is to be weighted and usually an amount within the range of 1 to 10 pounds per barrel of emulsion will increase the ability of the emulsion to support weighting material. At least 0.5 pound per barrel should be used to gain appreciable increase in the weight supporting ability.

The petroleum sulfonates useful in accordance with this invention can be termed the alkyl aryl sulfonates having a molecular weight such that the sulfonate is oleophilic, i.e. substantially soluble in oil. These petroleum sulfonates are obtained from the treatment of certain mineral hydrocarbon oils, such as lube stock, with sulfuric acid followed by neutralization with sodium hydroxide, and one class of these compounds have the following chemical formulae:

$$C_nH_{2n-6}SO_3Na \text{ and } C_nH_{2n-12}SO_3Na$$

These materials usually contain either a benzene or a naphthalene ring structure and each molecule is considered to have one reactive sulfonate group. The properties of the materials are in large measure established by the molecular weight, in that those with a molecular weight above 400 are of the oil-soluble type and those with a molecular weight less than 400 are the water-soluble type. Of course, this invention employs those having a molecular weight greater than 400, i.e., "$n$" in the above formula is larger than about 20. Suitable hydrocarbon sulfonates meeting the above requirements are available under the name "Petronate L."

MAGNESIUM OXIDE, ETC.

This ingredient functions to increase the stability of the emulsion, in that it decreases the emulsion's sensitivity to contamination by clay solids, it increases the ability of the emulsion to suspend weighting material without flipping, it reduces the fluid loss from the emulsion and in general makes the emulsion able to withstand various deleterious conditions without loss of stability. It has even been demonstrated that when an emulsion has been flipped by the addition of weighting material, it can be reconverted to the desired invert emulsion by the addition of this ingredient.

While magnesium oxide is greatly preferred as this ingredient, it has been found that lime and sodium carbonate can also be employed. However, when a dry concentrate is to be formed, the magnesium oxide is very greatly preferred over the lime, since the latter makes it difficult, if not impossible, to form a dry, free-flowing mix which is free from lumps. The magnesium oxide, on the other hand, causes a very dry, free-flowing mix to result. The sodium carbonate forms satisfactory concentrates, but the emulsions formed therefrom do not exhibit a substantial increase in stability until they have aged for a period of time, say, 24 hours. For this reason, the sodium carbonate is less preferred.

Desirably, the magnesium oxide should be employed in a concentration within the range of 0.5 to 3.0 pounds per barrel of emulsion. Larger amounts of lime and sodium carbonate are generally required, that is, concentrations in the range of 1.5 to 6 pounds per barrel are used.

To properly increase the stability of the emulsion, the magnesium oxide should be one which has been manufactured so that it has a relatively high adsorption capacity and surface activity. Thus, the dead burned material is not desirable and the more surface-active the magnesium oxide is, the better the emulsion properties which will result. One useful criterion for predicting the effectiveness of the magnesium oxide is the iodine absorption value thereof. As used herein, the term "iodine value" of this material means the number of milligrams equivalent of iodine absorbed per 100 grams of the material. Generally, an iodine value of at least 5 or one within the range of 5 to 60 denotes a magnesium oxide which will increase substantially the stability of the emulsion. As will be shown hereinafter, the increase in stability increases as the iodine value increases.

WATER PHASE

A feasible range for the water (either salt or fresh) phase concentration can be from about 30 to about 75 volume percent of the emulsion. If desired, a much broader range can be employed with the above formula, that is, within the range of 20 to 80 volume percent of the emulsion.

OIL PHASE

Either refined or crude oils are useful in compounding the emulsions of this invention. The amount of oil to be used will be equal, in volume percent, to 100 minus the volume percent of water to be employed; that is, 80 to 20 volume percent for the broad water range indicated above and 60 to 25 volume percent for the narrower water range.

RELATIVE AMOUNTS OF CONCENTRATE OIL AND WATER

There is given above the concentration range of the individual ingredients which can be employed. While it is possible to vary the concentration of the individual ingredients to produce different concentrates having different effects, it will be the usual commercial practice to manufacture a single concentrate and then to vary the proportion of it which is used. As an example, the petroleum sulfonate has the function of increasing the ability of the emulsion to suspend weighting material. For high-weight muds, it is possible to increase the concentration of sulfonate in the concentrate to more satisfactorily stabilize the emulsion. However, it will be the usual practice merely to add additional amounts of the concentrate to secure the increased concentration of sulfonate in the finished mud. This will also have the added advantage of increasing the concentrations of the other stabilizing ingredients to further stabilize the emulsion.

In working with concentrates of the above preferred formula, it has been found that as the emulsion is weighted to higher and higher weights, the amount of concentrate employed should also be increased in order to stabilize the emulsion. Thus, when working with substantially unweighted emulsions, e.g., those having a weight in the range of 8–10 pounds per gallon, approximately 40 pounds per barrel of the preferred concentrate can be used. This figure is based upon one barrel of oil and water before any concentrate or weighting material is added. As the amount of weighting material is increased, the concentration of concentrate should also be increased so that, for example, with muds having a weight of 18 pounds per gallon, it is preferred to use as much as 115 pounds per barrel of concentrate. Stated in another manner, for muds having weights in the range of 8–18 pounds per gallon, concentrates of the preferred formula should be present in the amount of 40 to 115 pounds per initial barrel of combined water and oil, with the concentrate being increased as the weight of the mud is increased.

To control the viscosity of the emulsion, it is desirable to increase the amount of oil and decrease the amount of water present as the emulsion increases in weight. For example, with an unweighted emulsion, it is generally preferred to use 40 volume percent of diesel oil and 60 volume percent of water based on the total volume of water and oil present prior to addition of any solids. As the weight of the mud is increased to, for example, 18 pounds per gallon, the amount of oil present should be increased to say, 65 volume percent and the water decreased to, say, 35 volume percent, on the same basis.

While it is possible to have many different combinations of water, oil and concentrate concentrations for different weights of mud, the above is intended as a guide to those skilled in the art.

In this connection, it is pointed out that as the degree of agitation of the emulsion during its formation is increased, it is possible to form emulsions of equal stability and weight with somewhat smaller amounts of concentrate. It has also been found that two emulsions having the same stability could be formed when using less violent agitation in one case than in the other, provided that a step-wise method was used. In this method, a portion of the concentrate (e.g. 40 pounds per barrel) is added to the oil and water and agitated. Then weighting material is added, either until the total amount desired is present or until the emulsion becomes of poor appearance. Thereupon, the remaining concentrate is added, followed by the remaining weighting material. When using this step-wise procedure, all emulsions were found to be susceptible of weighting to the desired weight with less concentrate than would be the case had the step-wise method not been employed.

ILLUSTRATIVE DATA

During the course of the work resulting in the data below, various dry-concentrate formulae were employed, as set forth in Table I:

*Table I*

| Ingredient | Parts by weight | | | |
|---|---|---|---|---|
| | F-1 | F-2 | F-3 | F-4 |
| Xact 811 | 22.0 | 18.0 | 18.0 | 22.0 |
| Perlite | | | | |
| NaCl | 7.0 | 7.0 | 7.0 | 7.0 |
| Alum | 7.8 | 7.8 | 7.8 | 7.8 |
| BaCl$_2$ | 9.6 | 9.6 | 9.6 | 9.6 |
| Sterox CD | 0.75 | 1.5 | 1.5 | 1.5 |
| Lecithin | 4.0 | 5.0 | 4.0 | 5.0 |
| Veg. Pitch 250 | 2.0 | | | 2.0 |
| Petronate L | 1.5 | | | |
| MgO | 1.5 | 1.5 | | 1.5 |
| Dowicide #1 | 0.5 | 0.5 | | 0.5 |
| Dowicide #6 | | | 0.2 | |
| Dowicide G | | | 0.008 | |
| Total | 56.65 | 50.9 | 48.108 | 56.9 |

Note.—Dowicide #1 is O-phenylphenol, Dowicide #6 is 2,3,4,6-tetrachlorophenol, and Dowicide G is sodium pentachlorophenol.

These various formulae were made up as discussed above.

PERLITE AND ITS EFFECT

To demonstrate the effect of perlite upon the rate of emulsification and its effect upon the weight-suspending ability of an emulsion, Formula F-1 of Table I was compounded using various perlite to Xact 811 weight ratios, as shown in Table II. Where perlite was employed, the vegetable pitch was first heated and then smeared on the perlite, after which the other ingredients were added. Where perlite was not employed, the liquids other than the vegetable pitch were added to all of the salts and the Xact 811 and then the vegetable pitch added. For the unweighted samples, 40 pounds per barrel of the various concentrates were employed and these were individually added to 40 volume percent of diesel oil and then 60 volume percent of water was added to the resulting mixture. For the weighted samples, the procedure was the same except that 50% diesel oil and 50% fresh water were used. Table II reflects the amount of barite which could be added over a ten-minute period before the emulsion became excessively thick, water was squeezed out, or the emulsion flipped to an oil-in-water emulsion.

Table II

| Perlite: Xact 811 weight ratio | Unweighted | | | | | Weighted grams barite/bbl. (weight of emulsion) |
|---|---|---|---|---|---|---|
| | Stability | | | Vis. | 30′ F.L.[1] | |
| | 5′ | 15′ | 30′ | | | |
| (1) 0:22 | 45 | 50 | 90 | 89 | 0.0 | 581 (15.6 p.p.g.). |
| (2) 6:16 | 75 | 150 | 150 | 80 | 0.0 | 618 (16.0 p.p.g.). |
| (3) 11:11 | 70 | 195 | 135 | 92 | [2] 0.4 | 775 (17.4 p.p.g.). |
| (4) 18:4 | 150 | 210 | 135 | 87 | 0.0 | 740 (17.1 p.p.g.). |
| (5) 18:0 | 180 | 360 | 300 | 110 | [2] 0.5 | 730 (17.0 p.p.g.). |

[1] 30 minute fluid loss.
[2] Oil.

As can be seen, the formulae with increased amounts of perlite are superior in that they are quicker dissolving, form emulsions faster, and allow the adding of barite to higher weights.

VEGETABLE PITCH AND ITS EFFECTS

Emulsions were prepared from Formulae Nos. F-2 and F-4 of Table I and then weighted with barite until they broke to an oil-in-water emulsion. Emulsions made from Formula F-4 could be weighted at least one to two pounds per gallon more than those of Formula F-2.

To demonstrate the effect of vegetable pitch upon improving the temperature stability of emulsions, the tests reported in Table III were run. In these tests, the indicated formula was made up into an emulsion using 40 pounds per barrel of the formula, 40 volume percent of diesel oil and 60 volume percent of fresh water. Portions of the resulting emulsions were heated for the indicated times in a rotating oven at the reported temperature. They were then removed, cooled to room temperature, and the reported properties determined.

Table III

| Emulsion using Formula No. | Heating, hrs. at 225° F. | Stability | Vis. | 30′ F.L. |
|---|---|---|---|---|
| F-2 | 0 | 345 | 86 | 0.5 oil. |
| F-2 | 4 | 156 | 67 | 0.6 oil. |
| F-2 | 8 | 145 | 68 | 0.7 oil. |
| F-2 | 16 | 105 | 62 | 1.2 oil. |
| F-2 | 24 | 90 | 64 | 1.4 oil. |
| F-2 | 48 | 60 | 73 | 2.6 o-w. |
| F-2 | 72 | 80 | 61 | 2.5 o-w. |
| F-4 | 0 | 345 | 129 | 0.6 oil. |
| F-4 | 4 | 192 | 70 | 0.0. |
| F-4 | 8 | 174 | 73 | 0.0. |
| F-4 | 16 | 159 | 70 | 0.0. |
| F-4 | 24 | 135 | 72 | 0.1 oil. |
| F-4 | 48 | 100 | 83 | 0.0. |
| F-4 | 72 | 165 | 78 | 0.2 oil. |
| | Heating, hrs. at 250° F. | | | |
| F-2 | 0 | 345 | 86 | 0.5 oil. |
| F-2 | 4 | 90 | 70 | 2.7 o-w. |
| F-2 | 8 | 75 | 72 | 2.8 o-w. |
| F-2 | 16 | 85 | 80 | 8.0 o-w. |
| F-2 | 24 | 75 | 69 | 7.6 o-w. |
| F-2 | 48 | 95 | 76 | 13.5 o-w. |
| F-2 | 72 | 90 | 67 | 21.5 o-w. |
| F-4 | 0 | 345 | 129 | 0.6 oil. |
| F-4 | 4 | 165 | 71 | 0.3 oil. |
| F-4 | 8 | 115 | 75 | 0.0. |
| F-4 | 16 | 145 | 83 | 0.0. |
| F-4 | 24 | 159 | 85 | 0.7 oil. |
| F-4 | 48 | 125 | 83 | 2.5 o-w. |
| F-4 | 72 | 70 | 69 | 24.0 o-w. |

The ability of emulsions prepared from Formula F-4 to withstand normal contaminants is as good or better than those prepared from Formula F-1 (without vegetable pitch). A series of tests demonstrating this are reported in Table IV. In these tests, 40 pounds per barrel of the indicated formula were added to 40% diesel oil and 60% distilled water to form the emulsion. Thereupon, the indicated contaminant in the amount reported was added to the emulsion and the properties measured.

It is particularly significant to note that since an invert emulsion in field use must often be able to withstand contamination from high pH lime muds, the feature of emulsions made up from Formula F-4 being more resistant to caustic and lime is very significant. As a matter of fact, lime actually improves the emulsion so that the formula of this invention is especially good when formed from lime-base muds as the water phase. In this connection, it might be noted that lime is generally considered to stabilize water-base muds to prevent thickening of such muds by shales. With emulsions made from Formula F-4, however, the lime thickens the fluid and shales thin the same.

Table IV

| Contaminant | Amount added | F-2 | | | F-4 | | |
|---|---|---|---|---|---|---|---|
| | | Stability | Vis. | 30′ F.L. | Stability | Vis. | 30′ F.L. |
| Sodium hydroxide. | 1 lb./bbl. | 115 | 71 | 0.4 oil | 115 | 71 | 0.0. |
| | 2 lb./bbl. | 165 | 88 | 2.0 o/w | 100 | 70 | 0.0. |
| | 3 lb./bbl. | 60 | 130 | 17.5 o/w | 90 | 81 | 9.0 o/w. |
| | 5 lb./bbl. | 25 | 130 | 18.0 o/w | 20 | 61 | 16.6 o/w. |
| Lime | 1 lb./bbl. | 150 | 73 | 0.2 oil | 90 | 65 | 0.0. |
| | 5 lb./bbl. | 105 | 172 | 11.0 o/w | 70 | 117 | 0.8 oil. |
| | 10 lb./bbl. | 80 | 165 | 11.5 o/w | 85 | 133 | 0.6 oil. |
| Sodium chloride. | 10 lb./bbl. | 75 | 69 | 0.0 | 85 | 66 | 0.0. |
| | 50 lb./bbl. | 60 | 69 | 0.0 | 55 | 69 | 0.0. |
| | 80 lb./bbl. | 45 | 76 | 0.0 | 35 | 74 | 0.0. |
| Fresh water | 20% | 70 | 97 | 0.0 | 60 | 94 | 0.0. |
| | 40 | 50 | 148 | 0.5 oil | 45 | 125 | 0.0. |
| | 60 | 25 | 135 | 0.8 oil | 35 | 190 | 0.0. |
| Salt Water (sat'd). | 20% | 50 | 93 | 0.0 | 65 | 95 | 0.0. |
| | 40 | 15 | 85 | 0.0 | 30 | 148 | 0.3 oil. |
| | 60 | 10 | 95 | 0.0 | 20 | 171 | 0.1 oil. |
| | Blank | 390 | 71 | 0.0 | 100 | 75 | 0.0. |

As indicated above, petroleum sulfonates form one ingredient in a preferred formula of this invention. To show the effect of vegetable pitch on weighted emulsions in which Petronate L is present, the tests reported in Table Va and Vb were run. For those of Table Va, Formula F-4 was employed except that the vegetable pitch was substituted by the same amount of Petronate L. For the tests of Table Vb, Formula F-4 was used, except that two parts of Petronate L were also added. In each instance, the formula was added at the rate of 40 pounds per barrel to 50 volume percent of diesel oil, which was then emulsified with 50 volume percent of fresh water. The emulsions were divided into portions which were weighted with barite to the weights shown in the tables and the particular properties measured.

Table Va

| Weight lb./gal. | Properties at room temperature | | | Aged 24 hours at 250° F. | | |
|---|---|---|---|---|---|---|
| | Vis. | Stability | 30′ F.L. | Vis. | Stability | 30′ F.L. |
| 7.9 | 40 | 240 | 0.0 | | | |
| 15.0 | 155 | 115 | 0.5 oil | [1] WSO | 0-20 | 3.1 o-w. |
| 16.0 | 120 | 135 | 0.1 oil | 115 | 80 | 3.7 o-w. |
| 17.0 | 152 | 135 | 0.0 | 150 | 100 | 3.5 o-w. |
| 18.0 | 200 | 125 | 0.3 oil | 211 | 115 | 3.2 o-w. |

[1] Water squeezed out.

Table Vb

| Weight lb./gal. | Properties at room temperature | | | Aged 24 hours at 250° F. | | |
|---|---|---|---|---|---|---|
| | Vis. | Stability | 30′ F.L. | Vis. | Stability | 30′ F.L. |
| 7.9 | 50 | 360 | 0.5 oil | | | |
| 15.0 | 140 | 360 | 0.0 | 135 | 70 | 0.9 oil. |
| 16.0 | 120 | 180 | 0.3 oil | 112 | 90 | 0.8 oil. |
| 17.0 | 155 | 165 | 0.0 | 155 | 100 | 0.5 oil. |
| 18.0 | 230 | 165 | 0.0 | [1] WSO | 100 | 0.6 oil. |

[1] Water squeezed out.

By comparing the fluid losses of the two tables, it can be seen that the vegetable pitch reduced the fluid loss at high temperatures.

EFFECT OF PETROLEUM SULFONATES

Emulsions were prepared from Formula F-4 which contained various amounts of Petronate L, as shown in Tables VI and VII. For Table VI, 40 pounds per barrel of the formula were added to 40 volume percent of diesel oil, which was then emulsified with 60 volume percent of distilled water. For the tests of Table VII, the same amount of formula was used, but the oil and water were to 50 volume percent each. For the tests of Table VII, barium sulfate was added to the resulting emulsion in the amount indicated while mixing for a period of five to ten minutes. The amount of barite shown was considered to be at a maximum when the emulsion became excessively thick (viscosity exceeded about 300 centipoises) or when water squeezed out (2% to 3% free water was considered excessive) or when the emulsion flipped to an oil-in-water type.

*Table VI*

| Amount of Petronate L present | Stability after mixing | | | Vis. | 30' F.L. |
|---|---|---|---|---|---|
| | 10 min. | 20 min. | 30 min. | | |
| 0.0 | 45 | 50 | 60 | 45 | 0.0 |
| 0.5 | 85 | 85 | 95 | 50 | 0.0 |
| 1.0 | 85 | 110 | 105 | 50 | 0.0 |
| 1.5 | 110 | 135 | 150 | 60 | 0.0 |
| 2.0 | 105 | 125 | 135 | 53 | 0.0 |
| 3.0 | 165 | 180 | 180 | 65 | 0.0 |
| 4.0 | 165 | 180 | 180 | 60 | 0.0 |

*Table VII*

| Amount of Petronate L present | Amount of barite added (lb./bbl.) | Mud weight lb./gal. |
|---|---|---|
| 0.0 | 290 | 12.4 |
| 0.5 | 315 | 12.7 |
| 1.0 | 532 | 15.2 |
| 1.5 | 570 | 15.5 |
| 2.0 | 725 | 17.0 |
| 3.0 | 813 | 17.7 |
| 4.0 | 874 | 18.2 |

THE EFFECT OF MAGNESIUM OXIDE, LIME, AND SODIUM CARBONATE

As indicated above, the mode of preparation of magnesium oxide apparently played an important part in producing a product capable of increasing the stability of emulsions. This conclusion is borne out by the results reported in Table VIII. In running the tests of Table VIII, 40 pounds per barrel of Formula F-2 (with the various indicated types of magnesium oxide, etc., employed therein) were added to 40 volume percent of diesel oil, which was then emulsified with 60 volume percent of distilled water.

It will be seen that as surface activity, as measured by the iodine value, of the magnesium oxide increases, the stability of the resulting emulsion likewise increases.

Lime also has the effect of increasing the stability of an emulsion. This is shown in Table IX, where the results were obtained by mixing 40 pounds per barrel of Formula F-3 with 40 volume percent of diesel oil, which was then emulsified with 60 volume percent of fresh water. The lime was then added in the amount indicated to the resulting emulsion and the properties measured.

*Table IX*

| | Stability | Vis. | 30' F.L. |
|---|---|---|---|
| Blank | 40 | 49 | 0.0 |
| 1 lb./bbl. lime | 50 | 46 | 0.0 |
| 3 lb./bbl. lime | 113 | 67 | [1] 0.7 |
| 5 lb./bbl. lime | 113 | 91 | 0.0 |

[1] Oil.

Similar emulsions were prepared and varying portions of lime added, as indicated in Table X. Also, 50 and 60 pounds per barrel of bentonite were added to the various emulsions to show that lime increases the stability of the emulsion toward clays.

*Table X*

| | 30' F.L. | Stability | Vis. | 50 lb./bbl. Bentonite, stability | 60 lb./bbl. Bentonite, stability |
|---|---|---|---|---|---|
| Blank | 0.0 | 56 | 60 | o./w. | |
| +1 lb./bbl. lime | 0.0 | 60 | 60 | 65 | o./w. |
| 1.5 lb./bbl. lime | 0.0 | 67 | 58 | 70 | 52 |
| 2.0 lb./bbl. lime | 0.0 | 70 | 58 | 75 | 58 |
| 2.5 lb./bbl. lime | 0.3 | 78 | 62 | 74 | 59 |
| 3.0 lb./bbl. lime | 0.2 | 80 | 63 | 95 | 72 |
| 3.5 lb./bbl. lime | 0.1 | 84 | 63 | 69 | 66 |
| 4.0 lb./bbl. lime | 0.0 | 88 | 65 | 69 | 60 |
| 4.5 lb./bbl. lime | 0.0 | 98 | 73 | 67 | 67 |
| 5.0 lb./bbl. lime | 0.0 | 98 | 77 | 65 | 65 |

Further, emulsions of the types employed for the tests of Tables IX and X were also compounded and had added to them various amounts of sodium carbonate. Upon the addition of three pounds per barrel of sodium carbonate, the stability of the emulsion was raised from 45 to 115 after the emulsion had aged overnight. However, the immediate stability of the emulsion was increased only to 70.

METHOD OF MANUFACTURE

There is some indication that the method of manufacture of the preferred formula has an effect on the properties of the emulsions. This is demonstrated by the results reported in Table XI.

*Table VIII*

| Type magnesium oxide | Immediate | | | Aged 24 hr., stability | Dry mix, aged 2½ months | | |
|---|---|---|---|---|---|---|---|
| | Vis. | Stability | 30' F.L. | | Vis. | Stability | 30' F.L. |
| #1 calcined magnesite dense hard burned material. Iodine value 0-3 mg. eq./100 g. Bulk density=60 lb./cu. ft. | 68 | 50 | [1] 0.3 | 60 | 68 | 60 | [1] 0.7 |
| #5 calcined magnesite. Iodine value 5-10 mg. eq./100 g. Bulk density=28 lb./cu. ft. | 104 | 150 | 0.0 | 185 | 76 | 130 | 0.0 |
| #15 calcined magnesite. Iodine value 10-18 mg. eq./100 g. Bulk density=24 lb./cu. ft. | 103 | 162 | 0.0 | 183 | 79 | 240 | 0.0 |
| #30 light calcined magnesia. Iodine value 25-40 mg. eq./100 g. Bulk density=8.5 lb./cu. ft. | 128 | 186 | 0.0 | 192 | 77 | 165 | 0.0 |
| #40 extra light calcined magnesia. Iodine value 40-60 mg. eq./100 g. Bulk density=5 lb./cu. ft. | 110 | 206 | 0.0 | 207 | 70 | 165 | 0.0 |
| Basic magnesium carbonate. Iodine value 15-25 mg. eq./100 g. Bulk density=5.5 lb./cu. ft. | 67 | 48 | 0.0 | 60 | 59 | 47 | 0.0 |
| Magnesium hydroxide. Iodine value 10-18 mg. eq./100 g. Bulk density=20 lb./cu. ft. | 69 | 73 | 0.0 | 88 | 80 | 165 | [1] 0.6 |

[1] Oil.

Table XI

| Method of manufacture | Immediate properties | | | | Emulsion aged 3 days | | |
|---|---|---|---|---|---|---|---|
| | Vis. | Stability | 30' F.L. | pH | Vis. | Stability | 30' F.L. |
| 1 | 70(85) | 135(150) | 0.2(0.9) | 4.7 | (110) | (180) | (0.6) |
| 2 | 92(117) | 225(225) | 0.0(0.6) | 4.8 | (90) | (120) | (0.5) |
| 3 | 97(105) | 315(240) | 0.2(0.6) | 4.8 | (115) | (135) | (0.5) |
| 4 | 98(138) | 316(340) | 0.0(0.6) | 4.8 | (110) | (240) | (0.9) |
| 5 | 82(105) | 195(210) | 0.0(0.4) | 5.0 | (85) | (230) | (0.1) | trate shown in Table XII was added to the indicated proportion of diesel oil and mixed for four minutes on a Hamilton Beach mixer. Then the indicated amount of fresh water was added over a one-minute period followed by mixing for an additional 25 minutes. Thereupon the specified amount of weighting material (barite) was added. After mixing, the weighted emulsion was cooled to 80° F. and its properties measured. Thereafter, the emulsion sample was distilled and the vaporized water and oil recovered. The distillation proceeded until the residue was substantially dry.

Table XII

| Wgt. lb./gal. | Initial Percent D.O. | Initial Percent W. | Lb./bbl. conc. initially | Lb./bbl. conc. in total vol. | Total amount | | | | Distillation | | | Total fluid phase (from distillation) | | Volume, total barrels | Properties (80° F.) | | | | |
|---|---|---|---|---|---|---|---|---|---|---|---|---|---|---|---|---|---|---|---|
| | | | | | Percent conc. | Percent D.O. | Percent W. | Percent barite | Percent solids | Percent D.O. | Percent W. | Percent oil | Percent water | | Stability | Funnel visc. (secs.) | Fann visc. (cps.) | 0/10 gels | 30' F.L. |
| 8.1 | 40 | 60 | 40 | 37.7 | 5.7 | 37.7 | 56.6 | 0.0 | 6.0 | 41.0 | 53.0 | 43.6 | 56.4 | 1.06 | 300 | 180 | 110 | 2/5 | 0.0 |
| 8.5 | 40 | 60 | 40 | 37.3 | 5.6 | 37.4 | 56.1 | 0.9 | ---- | ---- | ---- | ---- | ---- | 1.07 | 270 | 180 | 110 | 2/5 | 0.0 |
| 9.0 | 40 | 60 | 40 | 36.4 | 5.5 | 36.6 | 54.9 | 3.1 | 10.0 | 39.0 | 51.0 | 43.3 | 56.7 | 1.10 | 210 | 155 | 100 | 2/5 | 0.4 |
| 9.5 | 40 | 60 | 40 | 35.8 | 5.4 | 35.8 | 53.7 | 5.1 | ---- | ---- | ---- | ---- | ---- | 1.12 | 225 | 155 | 105 | 2/5 | 0.0 |
| 10.0 | 40 | 60 | 40 | 35.2 | 5.3 | 35.3 | 52.9 | 6.5 | 12.0 | 38.0 | 50.0 | 43.2 | 56.8 | 1.13 | 225 | 185 | 115 | 2/7 | 0.1 |
| 10.5 | 40 | 60 | 40 | 34.6 | 5.2 | 34.6 | 51.9 | 8.3 | ---- | ---- | ---- | ---- | ---- | 1.16 | 210 | 195 | 130 | 2/7 | 0.6 |
| 11.0 | 40 | 60 | 40 | 34.0 | 5.1 | 34.0 | 51.0 | 9.9 | 15.0 | 36.0 | 49.0 | 42.4 | 57.6 | 1.18 | 150 | 210 | 130 | 2/7 | 0.2 |
| 11.5 | 40 | 60 | 40 | 33.4 | 5.0 | 33.4 | 50.0 | 11.6 | ---- | ---- | ---- | ---- | ---- | 1.20 | 105 | 135 | 100 | 2/4 | 0.2 |
| 11.5 | 50 | 50 | 50 | 41.7 | 6.0 | 41.7 | 41.7 | 10.6 | ---- | ---- | ---- | ---- | ---- | 1.20 | 225 | 100 | 85 | 2/3 | 0.0 |
| 12.0 | 40 | 60 | 40 | 32.7 | 4.9 | 32.7 | 49.0 | 13.4 | 17.0 | 34.0 | 49.0 | 41.0 | 59.0 | 1.22 | 105 | 165 | 105 | 1/2 | 0.0 |
| 12.0 | 50 | 50 | 50 | 41.0 | 5.8 | 40.9 | 40.9 | 12.4 | ---- | ---- | ---- | ---- | ---- | 1.22 | 195 | 110 | 90 | 1/3 | 0.0 |
| 13.0 | 50 | 50 | 50 | 38.9 | 5.6 | 38.9 | 38.9 | 16.6 | 24.0 | 41.0 | 35.0 | 54.0 | 46.0 | 1.28 | 225 | 125 | 105 | 1/2 | 0.0 |
| 13.5 | 50 | 50 | 50 | 38.1 | 5.4 | 38.1 | 38.1 | 18.4 | ---- | ---- | ---- | ---- | ---- | 1.31 | 240 | 120 | 115 | 1/2 | 0.2 |
| 14.0 | 50 | 50 | 50 | 37.3 | 5.3 | 37.3 | 37.3 | 20.5 | 23.0 | 45.0 | 32.0 | 58.0 | 42.0 | 1.34 | 210 | 120 | 120 | 1/2 | 0.2 |
| 14.5 | 55 | 45 | 60 | 43.5 | 6.2 | 39.8 | 32.6 | 21.3 | ---- | ---- | ---- | ---- | ---- | 1.38 | 225 | 120 | 115 | 1/2 | 0.1 |
| 15.0 | 55 | 45 | 60 | 42.5 | 6.1 | 39.0 | 31.9 | 23.0 | 27.0 | 40.0 | 33.0 | 55.0 | 45.0 | 1.41 | 270 | 120 | 125 | 1/2 | 0.0 |
| 15.5 | 55 | 45 | 70 | 47.9 | 6.8 | 37.6 | 30.8 | 24.8 | ---- | ---- | ---- | ---- | ---- | 1.46 | 195 | 170 | 165 | 2/5 | 0.0 |
| 16.0 | 55 | 45 | 80 | 53.3 | 7.6 | 36.6 | 29.9 | 25.9 | 29.0 | 40.0 | 31.0 | 56.3 | 43.7 | 1.50 | 180 | 205 | 175 | 2/3 | 0.0 |
| 16.5 | 60 | 40 | 90 | 58.0 | 8.3 | 38.7 | 25.8 | 27.2 | ---- | ---- | ---- | ---- | ---- | 1.55 | 150 | 240 | 200 | 2/4 | 0.1 |
| 17.0 | 60 | 40 | 100 | 62.9 | 8.8 | 37.7 | 25.1 | 28.4 | 35.0 | 40.0 | 25.0 | 61.5 | 38.5 | 1.59 | 180 | 245 | 215 | 2/4 | 0.0 |
| 17.5 | 65 | 35 | 110 | 66.7 | 9.5 | 39.4 | 21.2 | 29.9 | ---- | ---- | ---- | ---- | ---- | 1.63 | 225 | 170 | 220 | 1/3 | 0.2 |
| 18.0 | 55 | 45 | 70 | 42.2 | 6.0 | 33.2 | 27.1 | 33.7 | ---- | ---- | ---- | ---- | ---- | 1.66 | (¹) | (¹) | (¹) | (¹) | (¹) |
| 18.0 | 55 | 45 | 80 | 48.2 | 6.7 | 33.1 | 27.1 | 33.1 | ---- | ---- | ---- | ---- | ---- | 1.66 | (²) | (²) | (²) | (²) | (²) |
| 18.0 | 55 | 45 | 85 | 51.2 | 7.2 | 33.1 | 27.1 | 32.6 | ---- | ---- | ---- | ---- | ---- | 1.66 | 240 | ---- | 210 | 1/2 | 0.0 |
| 18.0 | 60 | 40 | 95 | 57.2 | 7.9 | 36.1 | 24.1 | 31.9 | ---- | ---- | ---- | ---- | ---- | 1.66 | (²) | (²) | (²) | (²) | (²) |
| 18.0 | 60 | 40 | 100 | 60.2 | 8.4 | 36.1 | 24.1 | 31.4 | ---- | ---- | ---- | ---- | ---- | 1.66 | 150 | 365 | 280 | 4/7 | 0.0 |
| 18.0 | 60 | 40 | 105 | 63.3 | 9.1 | 36.1 | 24.1 | 30.7 | 37.0 | 38.0 | 25.0 | 60.3 | 39.7 | 1.66 | 225 | 150 | 185 | 1/4 | 0.4 |
| 18.0 | 65 | 35 | 115 | 69.3 | 10.0 | 39.2 | 21.1 | 29.7 | 35.0 | 44.0 | 21.0 | ---- | ---- | ---- | ---- | ---- | ---- | ---- | ---- |

¹ Flipped at 16.5 lb./gal.
² Too thick to measure.

In this table, the values indicated by the parentheses are of a second series of emulsions prepared in the same manner, using the same dry mixes after the latter had aged several days.

In method of manufacture No. 1, the vegetable pitch was added to 60% of the perlite of the preferred formula, mixed, and then the remainder of the perlite added. Thereafter, the balance of the dry ingredients of the preferred formula were added, followed by the remaining liquid ingredients. In method of manufacture No. 2, the method was the same except that the sodium chloride was added to the perlite before the vegetable pitch was added. For method of manufacture No. 3, the same procedure as No. 2 was followed except that both sodium and barium chloride were added to the perlite before the vegetable pitch was added. In No. 4, sodium chloride, barium chloride and alum were all added to the perlite prior to the vegetable pitch. In No. 5, these three salts plus the magnesium oxide were added to the perlite before the vegetable pitch.

It will be noted that method of manufacture No. 4 gives superior results.

EFFECT OF CONCENTRATION OF OIL, WATER AND CONCENTRATE IN WEIGHTED MUDS

The object of these tests was to determine the optimum amount of the preferred concentrate (as set forth in col. 2 hereof) necessary to make a series of weighted emulsions from 8.1 pounds per gallon to 18 pounds per gallon. In running these tests, the amount of concen- In Table XII, the column headings have the following meaning:

(1) Wgt., lb./gal.—Weight of emulsion after all ingredients, including barite, were added.

(2) Initial percent D.O. and W.—Volume percent of diesel oil and water present based on total liquid volume of oil plus water. In these tests, 350 parts of oil and water were used (one barrel equivalent) and the indicated amounts of solids added. As a result, the final emulsion had a volume in excess of one barrel equivalent due to the added volume of the solids.

(3) Lb./bbl. of conc., initially and in total volume—The pounds per barrel of concentrate based respectively on one barrel of combined oil and water and on one barrel of emulsion including solids.

(4) Total amount—Volume percentages of concentrate, oil, water and barite present in final emulsion based on final emulsion volume.

(5) Distillation—Volume percentages after water and oil distilled off, based on final emulsion volume.

(6) Total fluid phase—Volume percentages of oil and water recovered by distillation based on total volume of distilled liquids (overhead product).

All references to test procedure and to test results, except those relating to "stability," are made with respect to API Recommended Practice 29, Third edition, May 1950. The figures reported as "stability" were taken on a stability meter. This measurement was made by means of a probe assembly placed in the emulsion sample, the assembly carrying two silver strip electrodes spaced ⅛"

apart. Increasing alternating potential was placed across the electrodes until the emulsion breakdown occurred, as evidenced by initial current flow. The voltage required to produce such current flow is taken as a measure of the stability of the emulsion, with the higher voltages indicating the more stable emulsions, i.e. the higher readings in the various tables.

From the foregoing it will be seen that this invention is one well adapted to attain all of the ends and objects hereinabove set forth, together with other advantages which are obvious and which are inherent to the composition and method.

It will be understood that certain features and subcombinations are of utility and may be employed without reference to other features and subcombinations. This is contemplated by and is within the scope of the claims.

The invention having been described, what is claimed is:

1. An improved well fluid comprising a water-in-oil emulsion, containing water in quantity sufficient to supply from 20 to 80 volume percent of total water and oil content stabilized with a non-ionic oil-soluble emulsifier and a non-ionic water-soluble emulsifier, said emulsion containing sufficient oleophilic hydrocarbon sulfonate and expanded perlite to increase the ability of said emulsion to suspend weighting material therein, sufficient of a pitch containing higher molecular weight materials derived from the processing of a crude material which is selected from the class consisting of animal fats, vegetable oils, tall oil, and the amine and nitrile derivatives thereof to increase the stability of the emulsion at elevated temperatures, and sufficient of magnesium oxide to further increase the stability of the emulsion, said magnesium oxide having an iodine value of at least 5 milligram equivalents per 100 grams.

2. The well fluid of claim 1 wherein said pitch is derived from crude vegetable oil and is rich in fatty acids and polymers thereof.

3. The well fluid of claim 1 wherein said emulsion contains sufficient oil well fluid weighting material that said emulsion weighs at least 13 pounds per gallon.

4. An improved well fluid comprising a water-in-oil emulsion, containing water in quantity sufficient to supply from 20 to 80 volume percent of total water and oil content stabilized with a non-ionic water-soluble emulsifier and a non-ionic oil-soluble emulsifier, said emulsion containing at least 0.5 lb. per barrel of an oleophilic hydrocarbon sulfonate, from 3 to 15 lbs. per barrel of expanded perlite, from 0.5 to 15 lbs. per barrel of a pitch containing higher molecular weight materials derived from the processing of a crude material which is selected from the class consisting of animal fats, vegetable oils, tall oil, and the amine and nitrile derivatives thereof, and sufficient of magnesium oxide to increase the stability of the emulsion, said magnesium oxide having an iodine value of at least 5 milligram equivalents per 100 grams.

5. In a process for performing a well operation, the steps of forming a water-in-oil emulsion, containing water in quantity sufficient to supply from 20 to 80 volume percent of total water and oil content by admixing water and oil, stabilizing ingredients comprising a non-ionic oil-soluble emulsifier, from 0.5 to 15 lbs. per barrel of a "pitch" selected from the class consisting of vegetable pitch, tall oil pitch, ebony fat, and the amine and nitrile derivatives thereof, sufficient of magnesium oxide to increase the stability of the emulsion, said magnesium oxide having an iodine value of at least 5 milligram equivalents per 100 grams at least 0.5 lb. per barrel of an oleophilic hydrocarbon sulfonate, sufficient expanded perlite to increase the ability of the emulsion to suspend oil well fluid weighting material therein and then circulating the resulting emulsion through the well.

6. The process of claim 5 wherein said pitch is first dispersed on said expanded perlite and the resulting dispersion is then mixed with the water and oil.

7. A dry, free-flowing concentrate for adding to water and oil to prepare a water-in-oil emulsion fluid for use in wells which comprises an intimate mixture of magnesium oxide a "pitch" dispersed on expanded perlite, said "pitch" containing higher molecular weight materials derived from the processing of a crude material which is selected from the class consisting of animal fats, vegetable oils, tall oil, and the amine and nitrile derivatives thereof, and of a non-ionic oil-soluble emulsifier, said "pitch" being present in said mixture in a concentration such that upon adding a predetermined weight of the mixture to water and oil, each barrel of the resulting emulsion contains from 0.5 to 15 lbs. per barrel of said "pitch," said perlite being present in an amount at least sufficient to absorb said "pitch" so as to render the mixture dry and free-flowing, said magnesium oxide having an iodine value of at least 5 milligram equivalents per 100 grams and being present in said mixture in a concentration such that upon adding a predetermined weight of the mixture to water and oil, the resulting emulsion contains sufficient of the oxide to increase the stability of the emulsion.

8. An improved well fluid comprising a water-in-oil emulsion stabilized with a non-ionic oil-soluble emulsifier, said emulsion containing sufficient oleophilic hydrocarbon sulfonate and expanded perlite to increase the ability of said emulsion to suspend weighting material therein, sufficient of magnesium oxide to increase the stability of the emulsion, said magnesium oxide having an iodine value of at least 5 milligram equivalents per 100 grams and sufficient of a "pitch" containing higher molecular weight materials derived from the processing of a crude material which is selected from the class consisting of animal fats, vegetable oils, tall oil, and the amine and nitrile derivatives thereof to increase the stability of the emulsion at elevated temperatures.

References Cited in the file of this patent

UNITED STATES PATENTS

| | | |
|---|---|---|
| 2,216,955 | Moore | Oct. 8, 1940 |
| 2,350,154 | Dawson et al. | May 30, 1944 |
| 2,360,992 | Weiss | Oct. 24, 1944 |
| 2,661,334 | Lummus | Dec. 1, 1953 |
| 2,702,787 | Freeland | Feb. 22, 1955 |
| 2,713,032 | Tailleur | July 12, 1955 |
| 2,754,265 | Hoeppel | July 10, 1956 |
| 2,793,188 | Swain et al. | May 21, 1957 |
| 2,793,189 | Schuessler et al. | May 21, 1957 |
| 2,793,996 | Lummus | May 28, 1957 |
| 2,862,881 | Reddie | Dec. 2, 1958 |
| 2,876,197 | Watkins | Mar. 3, 1959 |